United States Patent [19]
Farnsworth et al.

[11] Patent Number: 5,890,482
[45] Date of Patent: Apr. 6, 1999

[54] BURNER STRUCTURE FOR GRIDDLE TOP

[75] Inventors: Craig A. Farnsworth, Chagrin Falls; Jeff J. Verlinden, Parma, both of Ohio

[73] Assignee: Keating of Chicago, Inc., Capron, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 745,462

[22] Filed: Nov. 12, 1996

[51] Int. Cl.⁶ ............................... F24C 3/00; A22C 7/00
[52] U.S. Cl. ................... 126/39 R; 126/41 R; 126/41 D; 126/41 F; 99/422; 99/447
[58] Field of Search ............................... 126/41 R, 41 D, 126/41 E, 39 R; 99/422, 447

[56] References Cited

U.S. PATENT DOCUMENTS

| | | | |
|---|---|---|---|
| 1,590,195 | 6/1926 | Kerr . | |
| 2,150,819 | 3/1939 | Brumbaugh | 158/104 |
| 2,559,979 | 7/1951 | Martois | 158/106 |
| 2,728,384 | 12/1955 | Anderson | 158/115 |
| 4,724,823 | 2/1988 | Simpson | 126/39 H |

Primary Examiner—Larry Jones
Attorney, Agent, or Firm—James A. Hudak

[57] ABSTRACT

A plurality of natural or LP gas-fired burners each having a port construction which produces a substantially even distribution of heat over the cooking surface of a griddle top is disclosed. Each burner includes a longitudinally extending portion having a first and a second series of ports, each series being positioned in a substantially linear orientation and each positioned substantially parallel to one another and to the longitudinal axis of the longitudinally extending portion of the burner. Each series of ports include a first grouping of ports having an orientation with respect to normal so as to produce flames directed toward the front of the griddle top and a second grouping of ports having an orientation with respect to normal so as to produce flames directed toward the rear of the griddle top. A pilot flame or gas ignition device is positioned at the transition point between the first plurality of ports and the second plurality of ports. Each burner is canted slightly downwardly so that the distance between the front of the burner and the front of the griddle top is less than the distance between the rear of the burner and the rear of the griddle top. The orientation of the ports and the downward canting of the burner results in substantially uniform heating of the griddle top and a reduction in the temperature variations over the surface thereof.

10 Claims, 3 Drawing Sheets

BURNER STRUCTURE FOR GRIDDLE TOP

TECHNICAL FIELD

The present invention relates, in general, to a burner structure for a griddle top and, more particularly, to a natural or liquified petroleum (LP) gas-fired burner having a port construction which produces a substantially even distribution of heat over the cooking surface of the griddle top.

BACKGROUND ART

Griddle tops, such as those that are used for grilling foods, are typically electrically or gas heated and utilize a number of different types of constructions. Such griddle tops are usually fabricated from a steel or iron upper plate to provide a flat, durable and abrasion-resistant cooking surface. Because of the limited thermal conductivity of steel or iron, griddle tops typically provide a relatively even distribution of heat over the cooking surface only if the electrical or gas heating sources are positioned substantially evenly within or under the griddle tops. One type of griddle top construction uses a plurality of sub-plates or lower plates having cast-in electrical heating elements. These sub-plates are fabricated from a material that has a higher thermal conductivity then either steel or iron so as to more evenly distribute the heat from the electrical heating elements over the steel or iron upper plates. Alternatively, if natural or LP gas-fired burners are utilized, the sub-plate or lower plate may be configured to promote the distribution of the heat produced by the burners over the steel or iron upper plate. Regardless of whether the griddle plate is heated through the use of electrical heating elements or natural or LP gas-fired burners, due to convection and the resulting cooling produced by same, the front of the griddle top is typically at a lower temperature than the rear of the top resulting in an uneven distribution of heat over the cooking surface. Tests indicate that an uneven distribution of heat over the cooking surface of griddle tops results in unevenly cooked foods and the possibility that harmful bacteriological contaminants within the food may not be thermally destroyed during the cooking process.

In view of the foregoing, it has become desirable to develop a natural or LP gas-fired burner for a griddle top that provides a substantially even distribution of heat over the cooking surface of the griddle top.

SUMMARY OF THE INVENTION

The present invention solves the problems associated with the prior art griddle tops by providing a natural or LP gas-fired burner having a port construction which produces a substantially even distribution of heat over the cooking surface of the griddle top. The griddle top utilizes one or more pairs of natural or LP gas-fired burners and a pilot flame interposed between the adjacent burners which form a pair of burners. Each burner has a configuration comprising a first longitudinally extending portion, a second longitudinally extending portion and a curved portion interconnecting the first and second longitudinally extending portions. The top surface of the first longitudinally extending portion of each burner includes a first and a second series of ports, each series positioned in a substantially linear orientation and each positioned substantially parallel to one another and to the longitudinal axis of the first longitudinally extending portion of the burner. Both first series of ports and second series of ports are comprised of a first plurality of ports having an orientation with respect to normal so as to produce flames generally directed toward the front of the griddle top and a second plurality of ports having an orientation with respect to normal so as to produce flames generally directed toward the rear of the griddle top. A pilot flame is positioned between each pair of adjacent burners at the transition point between the first plurality of ports and the second plurality of ports within the burner. Each burner is canted slightly downwardly so that the distance between the rear portion of the burner and the rear of the griddle top is greater than the distance between the front of the burner and the front of the griddle top. Since the first plurality of ports produces flames directed toward the front of the griddle top, additional heat from the flames is provided to the front portion of the griddle top where there is a tendency for the griddle surface to cool. As for the second plurality of ports which produces flames directed toward the rear of the griddle top, the angle of inclination of these ports with respect to normal assists in exhausting combustion gases toward the rear of the griddle where the gases pass through a flue into the atmosphere. A slight downward canting of the rear of the burner also assists in the heating of the front portion of the griddle top and the exhausting of combustion gases into the flue adjacent the rear of the griddle. It has been found that by orientating the first plurality of ports so as to produce flames directed toward the front of the griddle top and by orientating the second plurality of ports so as to produce flames directed toward the rear of the griddle top and by canting the rear of the burner downwardly results in a substantially uniform heating of the griddle top and a significant reduction in temperature variations over the surface thereof.

DESCRIPTION OF THE PREFERRED EMBODIMENT

Figure 1:
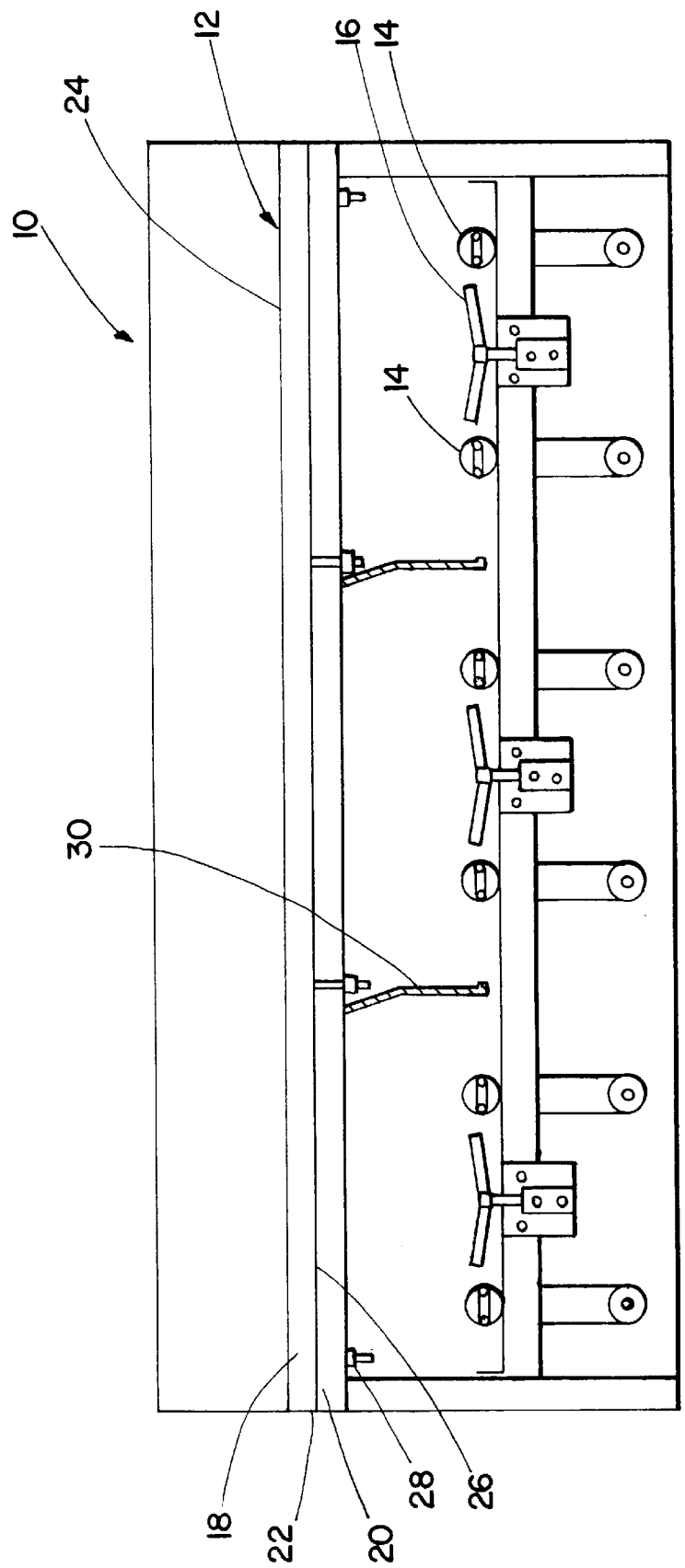
FIG. 1 is a front elevational view of a natural or liquified petroleum (LP) gas-fired griddle incorporating the burner of the present invention.

Referring now to the drawings where the illustrations are for the purpose of describing the preferred embodiment of the present invention and are not intended to limit the invention described herein, FIG. 1 is a front elevational view of a natural or liquified petroleum (LP) gas-fired griddle 10 incorporating the present invention. The griddle 10 is comprised of a griddle top, shown generally by the numeral 12, one or more pairs of natural or liquified petroleum (LP) gas-fired burners 14 and a pilot flame 16 or other gas ignition device interposed between the adjacent burners 14 which form a pair of burners.

The griddle top 12 is typically rectangular or square in configuration and can be provided in various sizes. In a typical commercial cooking installation, the griddle top 12 might measure approximately 36 inches wide by 24 inches deep. Larger or smaller sizes of griddle tops 12 can be readily fabricated utilizing burners 14 of the present invention. The griddle top 12 can be placed within a cabinet or housing (not shown) or can be recessed within a counter top so that the surface of the griddle top 12 is, in effect, at counter top height. The griddle top 12 is comprised of an upper plate 18 and a lower plate 20 with a thermally conductive mastic material 22 therebetween. It should be noted that the lower plate 20 can be comprised of a plurality of separate plates positioned so as to be substantially parallel to one another and in the same plane, and oriented in spaced-apart relationship so that a thermal break exists between the laterally extending edges of adjacent plates. In this latter case, thermally conductive mastic material is also interposed between the upper plate and the lower plates. In either case, upper plate 18 is comprised of a relatively thick iron or steel plate. The top surface 24 of upper plate 18 may have some type of non-stick coating, plating or other treatment thereon to minimize the possibility of cooked food adhering thereto. The lower plate(s) 20 is formed from a relatively thick plate of aluminum or a similar material having a high thermal conductivity. The lower plate(s) 20 is attached to the bottom surface 26 of upper plate 18 by fasteners 28. A laterally extending baffle 30 is attached to the bottom surface 26 of upper plate 18 and is positioned between each pair of burners 14.

Figure 2:
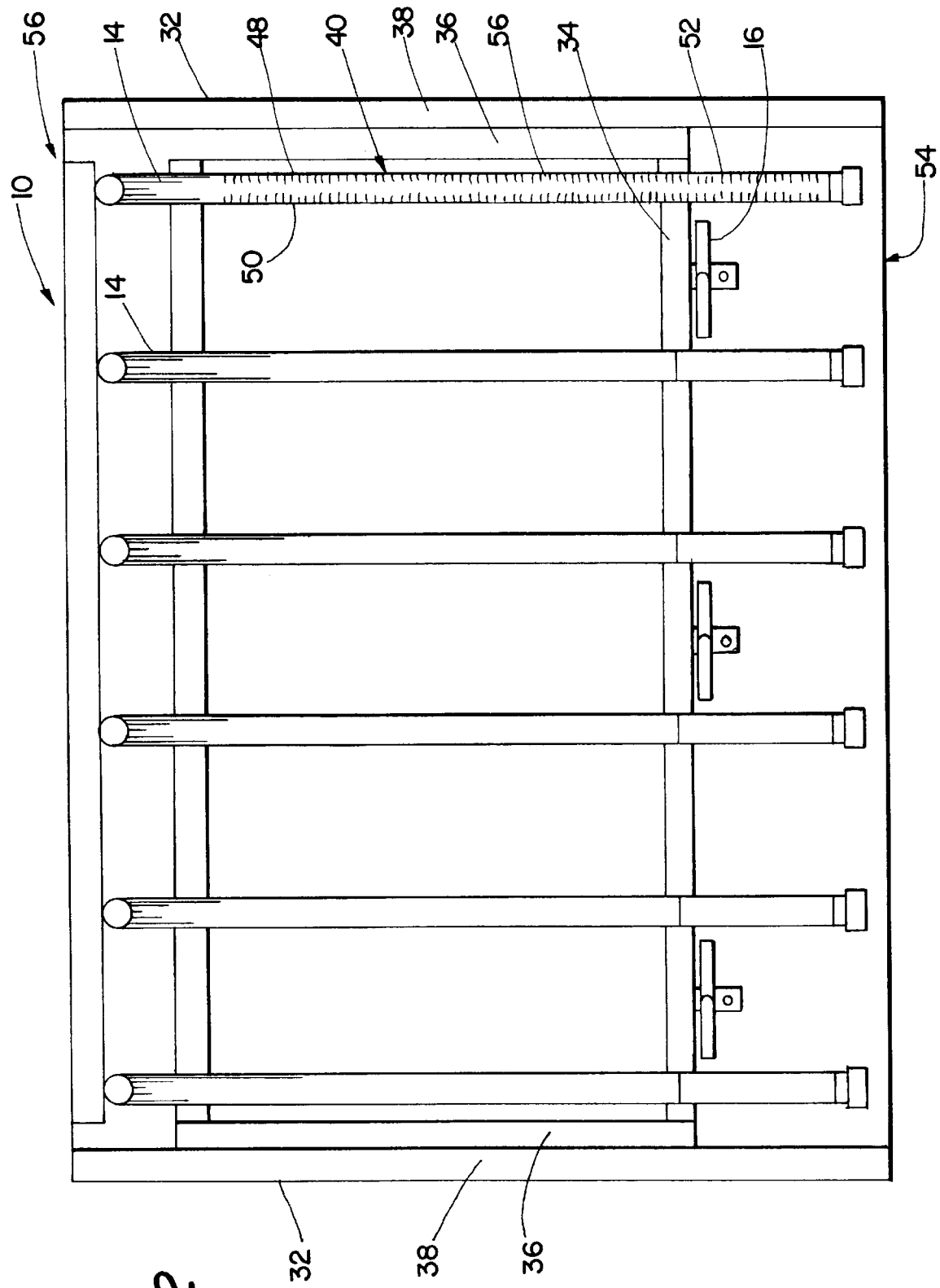
FIG. 2 is a top plan view of the griddle shown in FIG. 1 with the griddle top removed and illustrating the burners of the present invention.

Referring now to FIG. 2 which is a top plan view of the griddle 10 with the griddle top 12 removed, the burners comprising each pair of burners 14 are substantially parallel to one another and to the pair of burners adjacent thereto. Each burner 14 is also substantially parallel to the laterally extending edges 32 of the griddle top 10. The burners 14 are supported by a cross member 34 attached to a laterally extending member 36 which is attached to a laterally extending side member 38 which forms the laterally extending edge 32 of the griddle 10. A pilot flame 16 is interposed between each pair of burners 14 and is attached to cross member 34. Each burner 14 has a plurality of ports, shown generally by the numeral 40, formed in the top surface thereof and oriented in a linear orientation or row from the front of the front of the burner 14 to the rear thereof.

Figure 3:
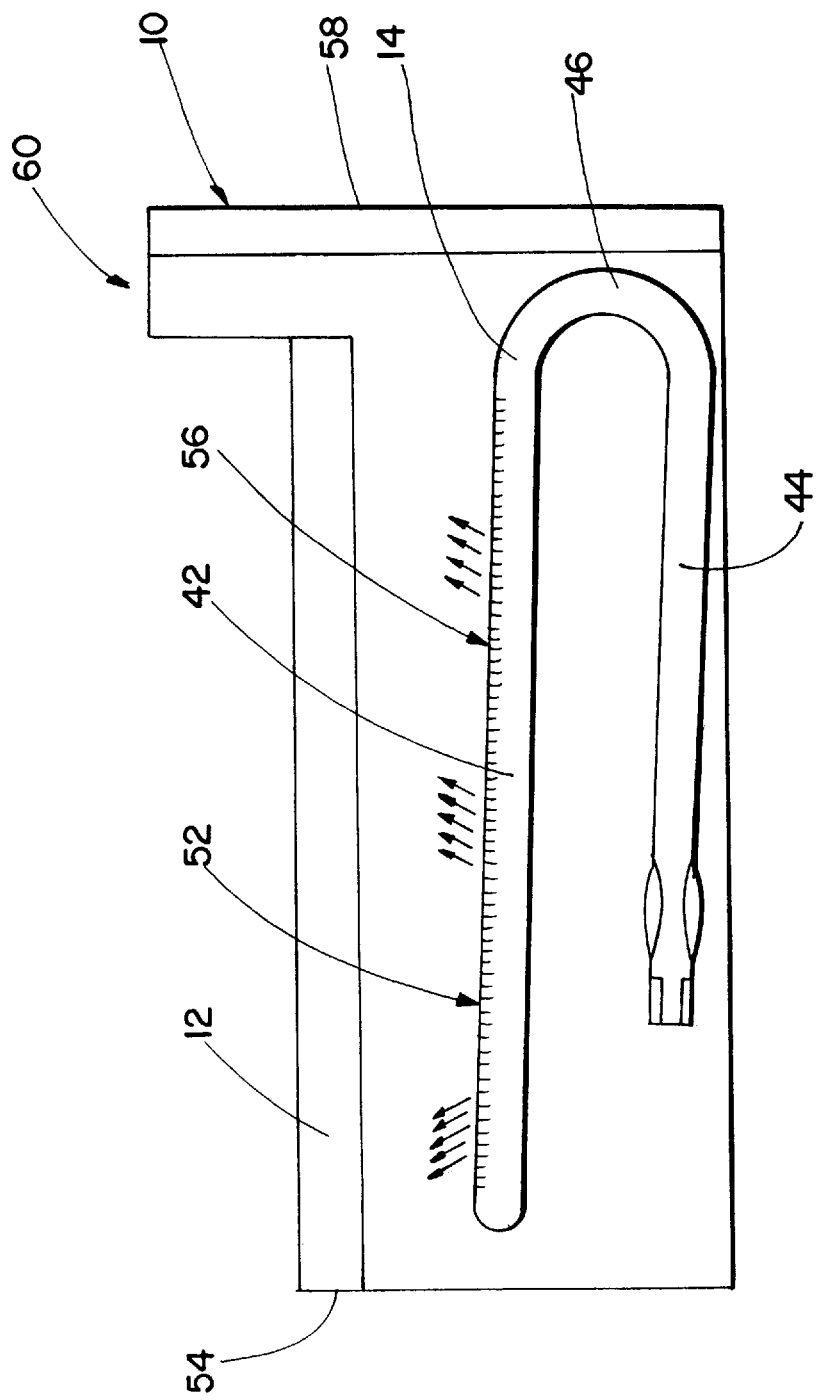
FIG. 3 is a side elevational view of the griddle shown in FIGS. 1 and 2 with the laterally extending side member of the griddle removed so as to illustrate the burner of the present invention.

Referring now to FIG. 3, a side elevational view of the griddle 10 is shown with the laterally extending side member 38 removed. Each burner 14 is typically formed from a tubular metal stamping with a configuration comprising a first longitudinally extending portion 42, a second longitudinally extending portion 44 and a curved portion 46 interconnecting the first and second longitudinally extending portions 42 and 44, which are substantially parallel to one another. The top surface of the first longitudinally extending portion 42 of each burner 14 includes a first series of ports, shown generally by the numeral 48, in a substantially linear orientation, and a second series of ports, shown generally by the numeral 50, in a substantially linear orientation, each series 48, 50 of ports 40 being positioned so as to be substantially parallel to the longitudinal axis of the first longitudinally extending portion 42 of the burner 14, as shown in FIG. 2. First series 48 of ports 40 is positioned so as to be spaced apart from and substantially parallel to second series 50 of ports 40 along the top surface of each burner 14. Both first series 48 of ports 40 and second series 50 of ports 40 is comprised of a first plurality of ports, shown generally by the numeral 52, having an orientation with respect to normal so as to produce flames generally directed toward the front 54 of the griddle top 12 and a second plurality of ports, shown generally by the numeral 56, having an orientation with respect to normal so as to produce flames generally directed toward the rear 58 of the griddle top 12, as shown in FIG. 3. Typically, the number of ports comprising the second plurality 56 of ports 40 is approximately 3½ to 4 times the number of ports comprising the first plurality 52 of ports 40. The cross member 34 and the pilot flames 16 connected thereto are attached to the burners 14 at the transition point between the first plurality 52 of ports 40 and the second plurality 56 of ports 40. In this manner, the pilot flame 16 can be utilized to ignite the gas emanating from ports 40 in each burner 14 regardless of whether the ports 40 have an orientation which produces flames directed toward the front 54 of the griddle top 12 or toward the rear 58 of the griddle top 12. In addition, each burner 14 can be canted slightly downwardly so that the distance between the rear portion of the burner 14 and the rear 58 of the griddle top 12 is greater than the distance between the front of the burner 14 and the front 54 of the griddle top 12. Since the first plurality 52 of ports 40 produces flames directed toward the front 54 of the griddle top 12, additional heat from the flames is provided to the front portion of the griddle top 12 where there is a tendency for the griddle surface to cool. With respect to the second plurality 56 of ports 40 which produces flames directed toward the rear 58 of the griddle top 12, the angle of inclination of this plurality of ports with respect to normal assists in exhausting combustion gases toward the rear of the griddle 10 where the gases pass through a flue (not shown but connected to the griddle 10 generally in the area designated by the numeral 60) into the atmosphere. The slight downward canting of the burner 14 also assists in the heating of the front portion of the griddle top 12 and the exhausting of combustion gases into the flue adjacent the rear of the griddle 10. It has been found that by orienting the first plurality 52 of ports 40 so as to produce flames directed toward the front 54 of the griddle top 12 and by orienting the second plurality 56 of ports 40 so as to produce flames directed toward the rear 58 of the griddle top 12 and by canting the rear of the burner 14 downwardly results in a substantially uniform heating of the griddle top 12 and a significant reduction in temperature variations over the surface thereof.

Certain modifications and improvements will occur to those skilled in the art upon reading the foregoing. It should be understood that all such modifications and improvements have been deleted herein for the sake of conciseness and readability, but are properly within the scope of the following claims.

We claim:

1. A gas-fired burner comprising a substantially tubular longitudinally extending body member having at least one series of ports formed in the surface thereof, said ports within each series of ports being oriented so as to be in a substantially linear relationship with respect to one another along the longitudinal axis of said body member and substantially parallel to said longitudinal axis of said body member, each of said series of ports comprising a first grouping of ports oriented in a first direction with respect to said longitudinal axis of said body member and a second grouping of ports oriented in a second direction with respect to said longitudinal axis of said body member.

2. The gas-fired burner as defined in claim 1 wherein the number of ports within said second grouping of ports is greater than the number of ports within said first grouping of ports.

3. The gas-fired burner as defined in claim 2 wherein the number of ports within said second grouping of ports is approximately three and one-half times the number of ports within said first grouping of ports.

4. The apparatus as defined in claim 1 further including a pilot burner positioned adjacent said body member and at the approximate transition between said first grouping of ports and said second grouping of ports within said body member.

5. A gas-fired griddle structure comprising an upper plate formed from ferrous material, at least one lower plate formed from a material dissimilar to the material comprising said upper plate, and at least one gas-fired burner positioned in a spaced-apart relationship with said at least one lower plate, said at least one gas-fired burner comprising a body member having at least one series of ports formed in the surface thereof, said ports within each series of ports being oriented so as to be in a substantially linear relationship with respect to one another along the longitudinal axis of said body member and substantially parallel to said longitudinal axis of said body member, each of said series of ports comprising a first grouping of ports oriented in a first direction with respect to said longitudinal axis of said body member and a second grouping of ports oriented in a second direction with respect to said longitudinal axis of said body member.

6. The apparatus as defined in claim 5 wherein the number of ports within said second grouping of ports is greater than the number of ports within said first grouping of ports.

7. The apparatus as defined in claim 5 wherein the number of ports within said second grouping of ports is approximately three and one-half times the number of ports within said first grouping of ports.

8. The apparatus as defined in claim 5 wherein said griddle structure includes a front griddle portion and a rear griddle portion and wherein said first grouping of ports is oriented toward said front griddle portion and said second grouping of ports is oriented toward said rear griddle portion.

9. The apparatus as defined in claim 5 further including a gas ignition device positioned adjacent said body member and at the approximate transition between said first grouping of ports and said second grouping of ports within said body member.

10. The apparatus as defined in claim 5 wherein said burner is canted so that the distance between said at least one lower plate and said first grouping of ports is less than the distance between said at least one lower plate and said second grouping of ports.

* * * * *